United States Patent [19]

Motonari et al.

[11] Patent Number: 5,006,411
[45] Date of Patent: * Apr. 9, 1991

[54] POLYIMIDE FILM HAVING FLUOROCARBON RESIN LAYER

[75] Inventors: Kazunori Motonari; Kazuo Kumamoto, both of Ube; Shigeto Turuda, Matsuura; Yutaka Ito, Matsuura; Taiichiro Mitsutake, Matsuura, all of Japan

[73] Assignees: Ube Industries, Ltd., Ube; Chukoh Chemical Industries, Ltd., Tokyo, both of Japan

[*] Notice: The portion of the term of this patent subsequent to Jan. 31, 2006 has been disclaimed.

[21] Appl. No.: 217,460

[22] Filed: Jul. 11, 1988

Related U.S. Application Data

[62] Division of Ser. No. 2,874, Jan. 13, 1987, Pat. No. 4,801,506.

[30] Foreign Application Priority Data

Jan. 13, 1986 [JP] Japan .................................. 61-5513
Jan. 13, 1986 [JP] Japan .................................. 61-5514

[51] Int. Cl.⁵ .......................... B32B 27/08; B05D 3/06
[52] U.S. Cl. ........................................ 428/421; 427/40; 427/41; 428/422; 428/473.5
[58] Field of Search .................... 428/421, 473.5, 336, 428/422; 427/40, 41

[56] References Cited

U.S. PATENT DOCUMENTS

| | | |
|---|---|---|
| 3,770,566 | 11/1973 | Gerow et al. .................. 428/336 |
| 4,505,982 | 3/1985 | Hoheisel ........................ 428/422 X |
| 4,606,955 | 8/1986 | Eastman et al. .............. 428/421 X |
| 4,647,508 | 3/1987 | Gazit et al. .................... 428/473.5 |
| 4,711,808 | 12/1987 | Marcus et al. ................. 428/421 X |
| 4,728,564 | 3/1988 | Akagi et al. .................... 428/421 X |
| 4,735,996 | 4/1988 | Nagai et al. .................... 428/422 X |
| 4,784,915 | 11/1988 | Sakagami et al. ............. 428/421 |
| 4,801,506 | 1/1989 | Motonari et al. ............... 428/422 X |

Primary Examiner—Thomas J. Herbert
Attorney, Agent, or Firm—Frishauf, Holtz, Goodman & Woodward

[57] ABSTRACT

A polyimide film having a fluorocarbon resin layer wherein a fluorocarbon resin film treated on its surface with electric discharge is superposed or a fluorocarbon resin coating layer is formed on a surface or surfaces of an aromatic polyimide film, said surface(s) of the polyimide film having been treated with electric discharge.

10 Claims, 2 Drawing Sheets

POLYIMIDE FILM HAVING FLUOROCARBON RESIN LAYER

This is a continuation division of application Ser. No. 07/002,874 filed Jan. 13, 1987, now U.S. Pat. No. 4,801,506.

BACKGROUND OF THE INVENTION

1. Field of the invention

The present invention relates to a polyimide film having a fluorocarbon resin layer. More particularly, the invention relates to an aromatic polyimide film having on at least one surface thereof a fluorocarbon resin layer.

2. Description of prior arts

As a resin film showing high heat resistance and high insulation, an aromatic polyimide resin film has been heretofore known. The aromatic polyimide resin film has been employed in a variety of arts, for instance, as a substrate of an electric or electronic device, as an insulation membrane, or as a coating membrane. Further, studies for searching new uses of the aromatic polyimide film have been done.

As described above, the aromatic polyimide film is of value due to its excellent properties. However, the aromatic polyimide film has problems in that moldability into optionally chosen shapes is not sufficient and that adhesiveness to other resins or materials and further adhesiveness between two polyimide films are poor.

Particularly, the poor adhesiveness of the polyimide film is troublesome in the case that the polyimide film in the form of a tape is employed as an insulating covering material for spirally winding around wires such as an ordinary copper wire or a rectangular copper wire. In more detail, since the spirally wound polyimide tape shows no adhesiveness between the overlapped surfaces, such overlapped surfaces are apt to slip off from each other when the wire covered with the polyimide tape is bent or coiled, causing poor insulation of the wire.

In view of the above-mentioned problem, it has been tried to impart adhesiveness to a surface of an aromatic polyimide film. As a result, there has been proposed a method that comprises superposing a fluorocarbon resin film treated on its surface with electric discharge on an aromatic polyimide film under heating, wherein the superposed fluorocarbon resin film serves as an adhesive layer. Further, there has been proposed a method that comprises coating a fluorocarbon resin dispersion on an aromatic polyimide film and then heating the coated layer to form an adhesive layer of the fluorocarbon resin on the surface of the polyimide film.

The present inventors have studies means for improving the surface adhesiveness of the aromatic polyimide film and noted that the polyimide film provided on its surface with a fluorocarbon resin film under heating shows only unsatisfactory adhesiveness even though the fluorocarbon resin film treated with electric discharge is employed, where the polyimide film is handled or employed under severe conditions. Particularly, where the aromatic polyimide film is made of a polyimide having as the principal acid moiety a carboxylic acid moiety derived from a biphenyltetracarboxylic acid dianhydride, the adhesive layer of the fluorocarbon resin film formed on the polyimide film according to the above-mentioned prior art does not show practically satisfactory adhesiveness.

The inventors have also studied means for improving the surface adhesiveness of the aromatic polyimide film and noted that the polyimide film provided on its surface with an adhesive layer by coating a fluorocarbon resin dispersion on the film surface and subsequently heating the coated layer to a temperature of higher than 150° C. shows deterioration of physical properties of the polyimide film. For instance, the polyimide film treated to such high temperature shows lowering of the physical strength and physical deformation such as wrinkles and slack on the surface. Particularly, where the aromatic polyimide film is made of a polyimide having as the principal acid moiety a carboxylic acid moiety derived from a biphenyltetracarboxylic acid dianhydride, the adhesive layer of the fluorocarbon resin dispersion formed on the polyimide film according to the above-mentioned prior art does not show practically satisfactory adhesiveness, if the procedure for the forming the adhesive layer is done under such condition as to suppress the deformation of the polyimide film.

SUMMARY OF THE INVENTION

Accordingly, an object of the present invention is to provide an aromatic polyimide film which is provided with improved surface adhesiveness.

Particularly, the present invention has an object to provide an aromatic polyimide film made of a polyimide having as the principal acid moiety a carboxylic acid moiety derived from a biphenyltetracarboxylic acid dianhydride, which is provided with improved surface adhesiveness.

There is provided by the present invention a polyimide film having a fluorocarbon resin layer wherein a fluorocarbon resin film treated on its surface with electric discharge is superposed on an aromatic polyimide film treated on its surface with electric discharge in such manner that the discharge-treated surface of the fluorocarbon resin film faces the discharge-treated surface of the polyimide film.

There is further provided by the present invention a polyimide film having a fluorocarbon resin layer on both surfaces thereof wherein fluorocarbon resin films treated on a surface thereof with electric discharge are superposed, respectively, on both surfaces of an aromatic polyimide film, said surface having been treated with electric discharge in such manner that the discharge-treated surface of each of the fluorocarbon resin films faces the discharge-treated surface of the polyimide film.

There is furthermore provided by the present invention a polyimide film having a fluorocarbon resin layer wherein a fluorocarbon resin coating layer is formed on a surface of an aromatic polyimide film, the surface having been treated with electric discharge.

There is further provided by the present invention a polyimide film having a fluorocarbon resin layer on both surfaces thereof wherein fluorocarbon resin coating layers are formed, respectively, on both surfaces of an aromatic polyimide film, said surfaces of the polyimide film having been treated with electric discharge.

In the present invention, there is given no limitation to the thickness of the material by the term "film". Accordingly, examples of material expressed by the term "film" include various thin materials such as generally called "membrane", "sheet" and "plate".

DETAILED DESCRIPTION OF THE INVENTION

Figure 1:
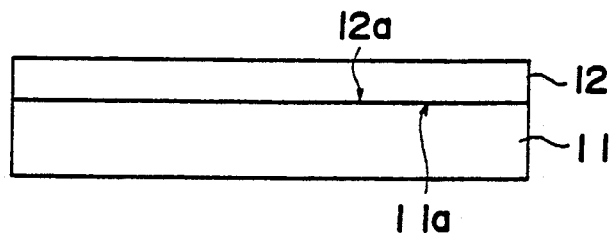
FIGS. 1-8 illustrate representative examples of the constitution of the polyimide film having on its surface a fluorocarbon resin layer according to the present invention.

In the aromatic polyimide film having the fluorocarbon resin layer (i.e., adhesive layer) on the surface according to the present invention, the adhesion between the fluorocarbon resin layer and the polyimide film is markedly improved. Therefore, the aromatic polyimide film with the adhesive layer of the invention shows little unfavorable behavior such as separation or slippage of the adhesive layer from the polyimide film.

Further, in the the aromatic polyimide film having the fluorocarbon resin layer (i.e., adhesive layer) on the surface according to the present invention, the improved adhesion between the fluorocarbon resin layer and the polyimide film is kept even under such condition that the polyimide film is kept in contact with water or moisture. Accordingly, the polyimide film with the adhesive layer of the invention shows less lowering of the adhesive strength even when stored under atmospheric conditions. Such high duration of adhesiveness of the polyimide film with the adhesive layer of the invention is very advantage when it is employed in practice.

Furthermore, the preparation of the polyimide film with the adhesive layer of the invention requires heating at lower temperatures than those required for the heating procedures of the conventional arts. Accordingly, the thermal deterioration and deformation of the adhesive layer and the polyimide film which may occur in the preparation of the laminated film are effectively reduced in the case where the polyimide film with the adhesive layer according to the present invention is prepared.

A number of aromatic polyimide films made of various aromatic polyimides are known. Such known aromatic polyimides can be employed as the aromatic polyimide film of the present invention. The aromatic polyimide comprises an aromatic tetracarboxylic acid moiety and an aromatic diamine moiety. It is known that a variety of aromatic polyimides having various physical and chemical properties can be prepared by selecting compounds having various chemical structures for respective moieties.

Examples of the aromatic tetracarboxylic acid moieties of the aromatic polyimides include 3,3',4,4'-benzophenonetetracarboxylic acid, 2,3,3',4'-benzophenonetetracarboxylic acid, pyromellitic acid, 3,3',4,4'-biphenyltetracarboxylic acid, 2,3,3',4'-biphenyltetracarboxylic acid, and acid dianhydrides, esters, and salts of these tetracarboxylic acids. The present invention is particularly advantageously utilized in the case that the aromatic polyimide film is made of a polyimide having as the principal acid moiety a carboxylic acid moiety derived from a biphenyltetracarboxylic acid dianhydride such as 3,3',4,4'-biphenyltetracarboxylic acid dianhydride or 2,3,3',4'-biphenyltetracarboxylic acid dianhydride.

Examples of the aromatic diamine moieties of the aromatic polyimides include p-phenylenediamine, m-phenylenediamine, 2,4-diaminotoluene, 4,4'-diaminodiphenyl ether, 4,4'-diaminodiphenylmethane, o-tolidine, 1,4-bis-(4-aminophenoxy)benzene, o-tolidinesulfone, bis(amino-phenoxy-phenyl)methane and bis(aminophenoxy-phenyl)-sulfone.

Various process are also known for the preparation of polyimides using the aromatic carboxylic acids or their derivatives and the aromatic diamines. For example, the polyimide can be prepared by one step reaction for polymerization-imidation which comprises heating an aromatic carboxylic acid or its derivative and an aromatic amine in polar organic solvent. Alteratively, the polyimide in the form of a film can be prepared by initially reacting an aromatic carboxylic acid or its derivative and an aromatic amine in a polar organic solvent at a low temperature around room temperature to produce a polyamic acid and then imidizing the polyamic acid in the form of a coated film.

There is no specific limitation with respect to the aromatic polyimide film, and aromatic polyimide films prepared by any process can be employed in the present invention.

As described hereinbefore, there has been known a method of superposing a fluorocarbon resin film on a surface of an aromatic polyimide film to form an adhesive layer.

The fluorocarbon resin employed in the invention can be a film of any fluorocarbon resin. Examples of the fluorocarbon resins employable for the preparation of a fluorocarbon resin film of the invention include a copolymer of tetrafluorethylene and hexafluorpropylene (FEP), a fluorinated alkoxyethylene resin (PFA), fluoroethylene-propylene-ether resin (EPE), and tetrafluoroethylene resin (TFE).

The electric discharge treatment for the fluorocarbon resin film is already known. For instance, corona discharge or plasma discharge is generated on a surface of a fluorocarbon resin film. The operation and conditions for the electric discharge treatment can be appropriately determined in consideration of the desired conditions of the film surface, physical properties of the film, and other requirements in the known manner.

Until now, there has not been known whether the electric discharge treatment is applicable to an aromatic polyimide film. As a study of the present inventors, it has been now found that a surface of the aromatic polyimide film can be treated with electric discharge in operation and conditions similar to those known for electric discharge treatment of heat-resistant synthetic resin film.

Therefore, the electric discharge treatment of a surface of an aromatic polyimide film can be performed by generating corona discharge or plasma discharge on the surface of the film. The operation and conditions for the electric discharge treatment of the aromatic polyimide film can be appropriately determined in consideration of the desired conditions of the film surface, physical properties of the film, and other requirements in the known manner. For instance, if greater electric discharge is applied to the film surface, the physical strength of the film weakens, while the adhesiveness and activity of the treated surface increases. If less electric discharge is applied to the film surface, the adhesiveness and activity of the treated surface is not satisfactorily provided. Accordingly, the operation and conditions for the discharge treatment can be chosen appropriately taking such tendency into consideration. For instance, the corona discharge can be advantageously done utilizing an electric power in the range of 20 to 300 W/$m^2$.min.

The procedure of superposing the treated fluorocarbon resin on the surface of the treated aromatic polyimide film can be done in the following manner.

The polyimide film and the fluorocarbon resin is combined and passed through clearance between a metal roller and a rubber roller of a press roller at a pressure of approx. 0.5 to 5.0 kg/cm², and at a temperature of approx. 50° to 250° C., preferably approx. 8° to 200° C. Thus joined composite is then heated to a temperature (maximum temperature) in the range of approx. 250° to 450° C., preferably approx. 300° to 400° C., for approx. 0.5 to 5 min., with no pressure applied.

In the present invention, the fluorocarbon resin film can be provided on a single surface of the aromatic polyimide film. It is, however, preferred that the polyimide film has the fluorocarbon resin film on both surfaces thereof, in the case that the composite film is employed for sue requiring adhesion on both surfaces such as for the use as a covering material for insulation of electric wire.

As is described hereinbefore, a process for coating a fluorocarbon resin dispersion on a polyimide film and heating the coated layer to form the fluorocarbon resin layer on the surface of the polyimide film is known. Such known process is employable for the preparation of the aromatic polyimide film having the adhesive layer according to the invention.

In a representative process for the formation of the coated fluorocarbon resin layer according to the invention, a fluorocarbon resin is dispersed in an appropriate liquid medium such as water or an aqueous organic solvent, the dispersion is then coated on the discharge-treated surface of the polyimide film, and the coated layer if finally heated. The fluorocarbon resin dispersion is so prepared as to contain the fluorocarbon resin generally in an amount of 10 to 55 wt. %, preferably 15 to 50 wt. %. The heating procedure is performed generally at temperatures of lower than 450° C. The heating procedure is preferably performed under such condition that the heating starts at a relatively low temperature and finally the temperature reaches a temperature of higher than 300° C., preferably a temperature of 300° to 400° C.

Examples of the fluorocarbon resin are described hereinbefore.

Examples of the typical constitutions of the aromatic polyimide film having the fluorocarbon resin layer thereon are described below by referring to the attached drawings.

FIG. 1 illustrates a constitution in which a fluorocarbon resin film 12 treated on its surface 12a with electric discharge id superposed on an aromatic polyimide film 11 treated on its surface 11a with electric discharge in such manner that the discharge-treated surface 12a of the fluorocarbon resin film faces the discharge-treated surface 11a of the polyimide film.

Figure 2:
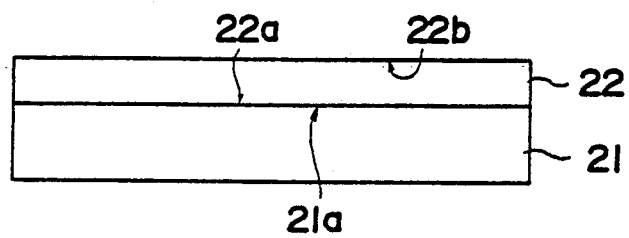

FIG. 2 illustrates a constitution in which a fluorocarbon resin film 22 treated on both surfaces 22a, 22b with electric discharge is superposed on an aromatic polyimide film 21 treated on its one surface 21a with electric discharge in such manner that the discharge-treated surface 22a of the fluorocarbon resin film faces the discharge-treated surface 21a of the polyimide film.

Figure 3:
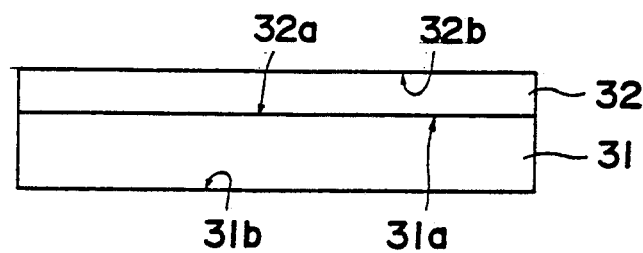

FIG. 3 illustrates a constitution in which a fluorocarbon resin film 32 treated on both surfaces 31a, 31b with electric discharge in such manner that the discharge-treated surface 32a of the fluorocarbon resin film faces the discharge-treated surface 31a of the polyimide film.

Figure 4:
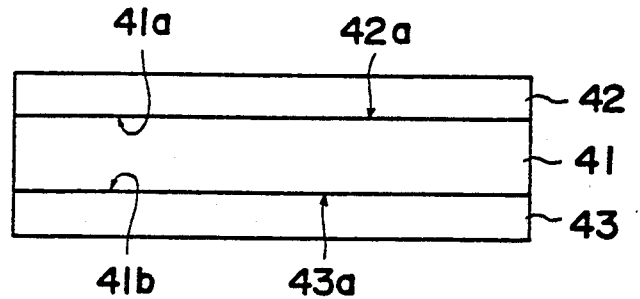

FIG. 4 illustrates a constitution in which two fluorocarbon resin films 42, 43 each treated on one surface 42a, 43a with electric discharge are superposed respectively on surfaces 41a, 41b of an aromatic polyimide film 41 treated on both surfaces 41a, 41b with electric discharge in such manner that the discharge-treated surfaces 42a, 43a of the fluorocarbon resin films face respectively the discharge-treated surfaces 41a, 41b of the polyimide film.

Figure 5:
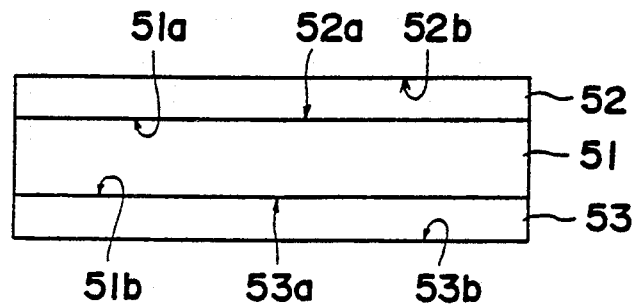

FIG. 5 illustrates a constitution in which two fluorocarbon resin films 52, 53 each treated on both surfaces 52a, 52b, 53a, 53b with electric discharge are superposed respectively on surfaces 51a, 51b of an aromatic polyimide film 51 treated on both surfaces 51a, 51b with electric discharge in such manner that the discharge-treated surfaces 52a, 53a of the fluorocarbon resin films face respectively the discharge-treated surfaces 51a, 51b of the polyimide film.

Figure 6:
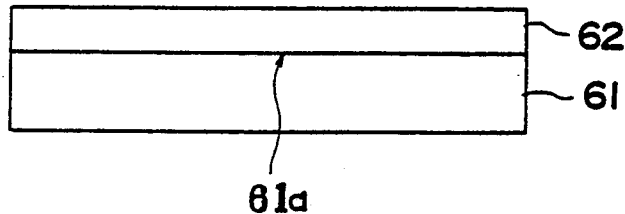

FIG. 6 illustrates a constitution in which a fluorocarbon resin coating layer 62 is formed on a surface 61a of an aromatic polyimide film 61, the surface 61a having been treated with electric discharge.

Figure 7:
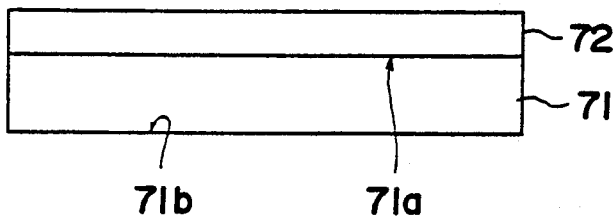

FIG. 7 illustrates a constitution in which a fluorocarbon resin coating layer 72 is formed on one of surfaces 71a, 71b of an aromatic polyimide film 71, the surfaces 71a, 71b both having been treated with electric discharge.

Figure 8:
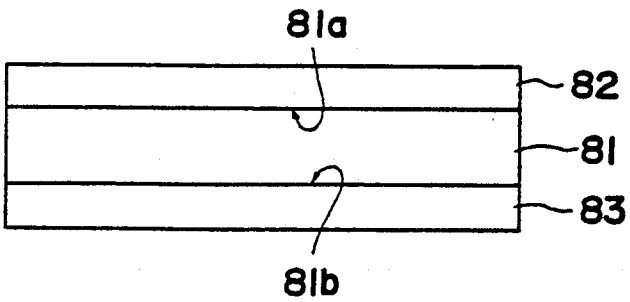

FIG. 8 illustrates a constitution in which a fluorocarbon resin coating layers 82, 83 are formed, respectively, on both surfaces 81a, 81b of an aromatic polyimide film 81, said surfaces 81a, 81b of the polyimide film having been treated with electric discharge.

The present invention is further described by the following examples.

EXAMPLE 1

As the fluorocarbon resin film, a long belt-shaped FEP (tetrafluoroethylene-hexafluoropropylene copolymer) film (width 500 mm, thickness 12.5 μm) treated on both surfaces with corona discharge was employed.

As the aromatic polyimide film, a long belt-shaped polyimide film (width 500 mm, thickness 25 μm) prepared from a polyimide solution (in p-chlorophenol) which had been produced from 3,3',4,4'-biphenyltetracarboxylic acid dianhydride and 4,4-diaminodiphenyl ether through polymerization and imidation. The polyimide film was treated on both surfaces with corona discharge under the condition set forth in Table 1.

On one surface of the polyimide film was placed the fluorocarbon resin film, and both were together passed continuously through a clearance between a metal roller heated to 130° C. and a rubber roller under pressure of 1.9 kg/cm². The pressed films were heated at 375° C. for 1 min to laminate the fluorocarbon resin on the polyimide film. Thus, a film composite was obtained.

COMPARISON EXAMPLE 1

The procedures of Example 1 were repeated except for omitting the electric discharge treatment of the surfaces of the polyimide film. Thus, a film composite comprising a polyimide film which has a fluorocarbon resin film on the surface was prepared.

Evaluation of Composite Film: Adhesion Strength

The adhesion strength (lamination strength) between the polyimide film and the fluorocarbon resin film was determined for each of the composite films. The determination was made for T-peel strength by means of a tensile tester (chuck clearance 50 mm, pulling rate 100 mm/min.), using five specimens (10 mm×150 mm) for each composite film.

Further, bonding strength between the polyimide film surface of the composite film and the fluorocarbon resin film surface of the same composite film was determined in the following manner. A composite film was placed on a composite film of the same type in such manner that the polyimide film surface of one composite film faced the fluorocarbon resin film surface of another composite film. These films were together heated to 350° C. for 20 seconds on a heat sealer equipped with upper and lower heating plates under pressure of 1.4 kg/cm². Thus, two composite films were bonded together. The adhesion strength (bonding strength) between the film composites was determined on the T-peel strength in the same manner as above, using five specimens for each bonded sheets.

The results are set forth in Table 1. the values given in Table 1 are mean values of values determined on the five specimens.

TABLE 1

| | Corona Discharge Condition (w/m²/min.) | Lamination Strength (g/cm) | Bonding Strength (g/cm) |
|---|---|---|---|
| Example 1 | 150 | more than 200 | 280 |
| Com. Ex. 1 | None | 40 | 180 |

EXAMPLE 2 AND COMPARISON EXAMPLE 2

As the fluorocarbon resin film and the aromatic polyimide film, the same fluorocarbon resin film having been treated with corona discharge as in Example 1 and the same aromatic polyimide film as in Example 1 except that both surfaces thereof were treated with corona discharge under the condition set forth in Table 2 were employed.

On one surface of the polyimide film was placed the fluorocarbon resin film, and both were together passed continuously through a clearance between a metal roller heated to 130° C. and a rubber roller under pressure of 1.9 kg/cm². The pressed films were heated at 375° C. for 1 min. to laminate the fluorocarbon resin on the polyimide film. Thus, a two-layer film composite was obtained.

On the surface of the polyimide film layer of the obtained film composite was placed the fluorocarbon resin film, and these were passed through a clearance between rollers and heated under the same conditions as above to give a three-layer film composite in which the polyimide film was provided with the fluorocarbon resin film on both surfaces.

Evaluation of Composite Film: Adhesion Strength

The adhesion strength (lamination strength) between the polyimide film and the former fluorocarbon resin film (the resin film provided first) was determined for each of the three-layer composite films in the same manner as described above.

Further, bonding strength between the fluorocarbon resin film surface of the three-layer composite film and the fluorocarbon resin film surface of the same composite film was determined in the same manner as stated above.

The results are set forth in Table 2. The values given in Table 2 are mean values of values determined on the five specimens.

TABLE 2

| | Corona Discharge Condition (w/m²/min.) | Lamination Strength (g/cm) | Bonding Strength (g/cm) |
|---|---|---|---|
| Example 2 | 150 | more than 200 | 650 |
| Com. Ex. 2 | None | 110 | 440 |

Evaluation of Composite Film: Water Resistance

The same specimens as employed in the above bonding strength test (which were prepared by bonding the composite films together) were kept in boiling water for 4 hours. Thus treated specimens were examined for the determination of bonding strength in the same manner as above.

The results are set forth in Table 3. The values given in Table 3 are mean values of values determined on the five specimens.

TABLE 3

| | Corona Discharge Condition (w/m²/min.) | Bonding Strength (g/cm) | Retention of Strength after boiling process |
|---|---|---|---|
| Example 2 | 150 | 565 | 87% |
| Com. Ex. 2 | None | 310 | 70% |

EXAMPLE 3 AND COMPARISON EXAMPLE 3

As the fluorocarbon resin film, a long belt-shaped PFA (fluorinated alkoxyethylene resin) film (width 500 mm, thickness 12.5 μm) treated on both surfaces with corona discharge was employed.

As the aromatic polyimide film, the same aromatic polyimide film as in Example 1 except that both surfaces thereof were treated with corona discharge under the condition set forth in Table 4 was employed.

On one surface of the polyimide film was placed the fluorocarbon resin film, and both were together passed continuously through a clearance between a metal roller and a rubber roller under pressure of 1.9 kg/cm². The pressed films were heated at 355° C. for 1 min to laminate the fluorocarbon resin on the polyimide film. Thus, a two-layer film composite was obtained.

Evaluation of Composite Film: Adhesion Strength

The adhesion strength (lamination strength) between the polyimide film and the fluorocarbon resin film was determined for each of the composite films in the same manner as described above.

Further, bonding strength between the polyimide film surface of the composite film and the fluorocarbon resin film surface of the same composite film was determined in the same manner as described above.

The results are set forth in Table 4. The values given in Table 4 are mean values of values determined on the five specimens.

TABLE 4

| | Corona Discharge Condition (w/m²/min.) | Lamination Strength (g/cm) | Bonding Strength (g/cm) |
|---|---|---|---|
| Example 3 | 50 | more than 200 | 370 |
| Com. Ex. S | None | 137 | 15 |

EXAMPLES 4 TO 7

As the fluorocarbon resin film, the same fluorocarbon resin film having been treated with corona discharge as in Example 1 was employed.

As the aromatic polyimide film, the same aromatic polyimide film as in Example 1 except that its surface was treated with corona discharge under the condition set forth in Table 5.

On one surface of the polyimide film was place the fluorocarbon resin film, and both were together passed continuously through a clearance between a metal roller and a rubber roller under pressure of 1.9 kg/cm². The pressed films were heated at 335° C. for 1 min. to laminate the fluorocarbon resin on the polyimide film. Thus, a two-layer film composite was obtained.

Evaluation of Composite Film: Adhesion Strength

The adhesion strength (lamination strength) between the polyimide film and the fluorocarbon resin film was determined for each of the composite films in the same manner as described above.

Further, bonding strength between the polyimide film surface of the composite film and the fluorocarbon resin film surface of the same composite film was determined in the same manner as described above.

The results are set forth in Table 5. The values given in Table 5 are mean values of values determined on the five specimens.

TABLE 5

|  | Corona Discharge Condition (w/m²/min) | Lamination Strength (g/cm) | Bonding Strength (g/cm) |
| --- | --- | --- | --- |
| Example 4 | 50 | more than 200 | 260 |
| Example 5 | 100 | more than 200 | 357 |
| Example 6 | 150 | more than 200 | 350 |
| Example 7 | 300 | more than 200 | 290 |

EXAMPLE 8

As the fluorocarbon resin, an aqueous dispersion of FEP (tetrafluorethylene-hexafluoropropylene copolymer) resin (resin content: 40 wt. %) was employed.

On both surfaces of the same aromatic polyimide film as in Example 1 was continuously coated the aqueous fluorocarbon resin dispersion. Thus coated polyimide film was placed in a heating furnace to heat the film at temperatures elevating from 90° C. to 300° C. to remove the water. The film was then heated in another heating furnace to 380° C. for 1 min. to form fluorocarbon resin coating layers (thickness 2.5 μm) on the polyimide film. Thus, a film composite was obtained.

COMPARISON EXAMPLE 4

The procedures of Example 8 were repeated except for omitting the electric discharge treatment of the surfaces of the polyimide film. Thus, a film composite comprising a fluorocarbon resin layer (thickness 2.5 μm) coated on the polyimide film was prepared.

Evaluation of Composite Film: Bonding Strength

Bonding strength between the surface of the fluorocarbon resin layer of the composite film and the fluorocarbon layer surface of another composite film was determined in the following manner. A composite film was placed on a composite film of the same type in such manner that the surface of the fluorocarbon resin layer of one composite film faced the fluorocarbon layer surface of another composite film. These films were together heated to 350° C. for 20 seconds on a heat sealer equipped with upper and lower heating plates under pressure of 1.4 kg/cm². Thus, two composite films were bonded together. The adhesion strength (bonding strength) between the film composites was determined on the T-peel strength in the manner as stated in Example 1, using five specimens for each bonded sheets.

The results are set forth in Table 6. The values given in Table 6 are mean values of values determined on the five specimens.

TABLE 6

|  | Corona Discharge Condition (w/m²/min) | Bonding Strength (g/cm) |
| --- | --- | --- |
| Example 8 | 150 | 430 |
| Com. Ex. 4 | None | 57 |

Evaluation of Composite Film: Water Resistance

The same specimens as employed in the above bonding strength test were kept in boiling water for 4 hours. Thus treated specimens were examined for the determination of bonding strength in the same manner as above.

The results are set forth in Table 7. The values given in Table 7 are mean values of values determined on the five specimens.

TABLE 7

|  | Corona Discharge Condition (w/m²/min.) | Bonding Strength (g/cm) | Retention of Strength after boiling process |
| --- | --- | --- | --- |
| Example 8 | 150 | 300 | 70% |
| Com. Ex. 4 | None | 36 | 64% |

EXAMPLES 9 TO 12

The same fluorocarbon resin dispersion as in Example 8 was treated on the same aromatic polyimide film as in Example 8 except that its surface was treated with corona discharge under the condition set forth in Table 8. Thus coated polyimide film was heated in the same manner as in Example 8 to obtain film composite comprising a fluorocarbon resin coating layers (thickness 2.5 μm) coated on the polyimide film.

Evaluation of Composite Film: Bonding Strength

The bonding strength between the polyimide film surface of the composite film and the fluorocarbon resin layer surface of the same composite film was determined in the same manner as described above.

The results are set forth in Table 8. The values given in Table 8 are mean values of values determined on the five specimens.

TABLE 8

|  | Corona Discharge Condition (w/m²/min.) | Bonding Strength (g/cm) |
| --- | --- | --- |
| Example 9 | 50 | 355 |
| Example 10 | 100 | 415 |
| Example 11 | 150 | 430 |
| Example 12 | 300 | 315 |

We claim:
1. A polyimide film having a fluorocarbon resin layer coated on a surface of an aromatic polyimide, wherein both surfaces of said film have been treated with corona discharge or plasma discharge for increasing adhesiveness and activity to the fluorocarbon resin layer and the fluorocarbon resin layer is coated on at least one of said treated surfaces.

2. The polyimide film of claim 1, wherein said fluorocarbon resin is tetrafluoroethylene-hexafluoropropylene copolymer.

3. The polyimide film having a fluorocarbon resin layer as claimed in claim 1, wherein the polyimide film is made of a polyimide having as the principal acid moiety a carboxylic acid moiety derived from a biphenyltetracarboxylic acid dianhydride.

4. The polyimide film having a fluorocarbon resin layer as claimed in claim 3, wherein said polyimide has the principal acid moiety 3,3',4,4'-biphenyltetracarboxylic acid dianhydride or 2,3,3'4'-biphenyltetracarboxylic acid dianhydride and as the aromatic diamine moiety, a moiety selected form the group consisting of p-phenylenediamine, m-phenylenediamine, 2,4-diaminotoluene, 4,4'-diaminodiphenyl ether, 4,4'-diaminodiphenylmethane, o-tolidine, 1,4-bis-(4-amionophenoxy)benzene, o-tolidinesulfone, bis(aminophenoxyphenyl)methane and bis(aminophenoxy-phenyl)-sulfone.

5. The polyimide film having a fluorocarbon resin layer as claimed in claim 3, wherein said polyimide has been produced by polymerization and imidation of 3,3',4,4'-biphenyltetracarboxylic acid dianhydride and 4,4'-diaminodiphenyl ether.

6. The polyimide film having a fluorocarbon resin layer as claimed in claim 1, wherein the fluorocarbon resin layer is coated on both of said treated surfaces.

7. The polyimide film having a fluorocarbon resin layer as claimed in claim 6, wherein the polyimide film is made of a polyimide having as the principal acid moiety a carboxylic acid moiety derived from a biphenyltetracarboxylic acid dianhydride.

8. The polyimide film having a fluorocarbon resin layer as claimed in claim 7, wherein said polyimide has as the principal acid moiety 3,3',4,4'-biphenyltetracarboxylic acid dianhydride or 2,3,3'4'-biphenyltetracarboxylic acid dianhydride and as the aromatic diamine moiety, a moiety selected from the group consisting of p-phenylenediamine, m-phenylenediamine, 2,4-diaminotoluene, 4,4'-diaminodiphenyl ether, 4,4'-diaminodiphenylmethane, o-tolidine, 1,4-bis-(4-aminophenoxy)benzene, o-tolidinesulfone, bis(aminophenoxyphenyl)methane and bis(aminophenoxy-phenyl)-sulfone.

9. The polyimide film having a fluorocarbon resin layer as claimed in claim 7, wherein said polyimide has been produced by polymerization and imidation of 3,3',4,4'-biphenyltetracarboxylic acid dianhydride and 4,4'-diaminodiphenyl ether.

10. The polyimide film of claim 9, wherein said fluorocarbon resin is tetrafluoroethylene-hexafluoropropylene copolymer.

* * * * *